United States Patent [19]
Gerard et al.

[11] Patent Number: 4,747,263
[45] Date of Patent: May 31, 1988

[54] CONTROL SYSTEM FOR THE FUEL CIRCUIT OF A GAS TURBINE ENGINE

[75] Inventors: Pierre M. H. Gerard, Vaux le Penil; Pierre M. Geyer, Melun; Christian A. F. Parisel, Combs-La-Ville, all of France

[73] Assignee: Societe Nationale d'Etude et de Construction de Moteurs d'Aviation "Snecma", Paris, France

[21] Appl. No.: 922,932

[22] Filed: Oct. 24, 1986

[30] Foreign Application Priority Data

Oct. 30, 1985 [FR] France ................................. 85 16099

[51] Int. Cl.$^4$ .............................................. F02C 9/28
[52] U.S. Cl. .................................................. 60/39.281
[58] Field of Search ...................................... 60/39.281

[56] References Cited

U.S. PATENT DOCUMENTS

| 3,050,941 | 8/1962 | Rogers | 60/39.281 |
| 3,086,581 | 4/1963 | Jay | 60/39.281 |
| 3,808,800 | 5/1974 | Taylor | 60/39.281 |
| 3,988,887 | 11/1976 | Lewis | 60/39.281 |
| 4,016,716 | 4/1977 | Evans | 60/39.281 |
| 4,208,871 | 6/1980 | Riple | 60/39.281 |

FOREIGN PATENT DOCUMENTS

| 1142235 | 9/1957 | France . |
| 2180483 | 11/1973 | France . |
| 301144 | 8/1954 | Switzerland . |
| 787795 | 12/1957 | United Kingdom . |

Primary Examiner—Louis J. Casaregola
Attorney, Agent, or Firm—Oblon, Fisher, Spivak, McClelland & Maier

[57] ABSTRACT

An electrical control system for a fuel circuit including a low pressure pump, a high pressure pump, a throttle valve and a pressurizing valve connected in series between a fuel reservoir and the fuel injectors of a gas turbine engine includes a first device including a first solenoid controlled valve capable of interruption of the connection between the outlet of the throttle valve and an inlet to a pressure drop detector which is normally connected across the throttle valve. The output of the pressure drop detector controls a control valve which can by-pass high pressure fuel output from the high pressure pump back to the pump inlet. The first device includes two, identical, parallel control channels each provided with its own independent power supply, a control first switch with two positions each leading to a respective processing circuit which has its output connected to one terminal of a respective solenoid winding of the bistable first solenoid controlled valve. In the "start" position of the first switch each channel independently causes operation of its respective first solenoid controlled valve to make the fuel circuit between the output of the throttle valve and the input of the pressure drop detector allowing fuel to be supplied to the start-up injectors and then the main injectors of the jet engine. In the "stop" position the signal is processed to operate the bistable valves to "break" the fuel circuit between the output of the supply regulator and the input to the pressure detector. This causes the by-pass valve to by-pass the fuel from the outlet to the inlet of the high pressure pump, cutting off the fuel supply to the injectors and stopping the engine. A second device acts directly in the by-pass valve to supply the fuel reservoir pressure instead of the outlet from the pressure drop detector to the control input of the by-pass valve so as to cause the by-pass valve to open so that fuel is recirculated from the high pressure pump to its input. This second device acts as a safety cut-off device in the event of failure of the first device.

5 Claims, 2 Drawing Sheets

CONTROL SYSTEM FOR THE FUEL CIRCUIT OF A GAS TURBINE ENGINE

BACKGROUND OF THE INVENTION

1. Technical Field

The present invention relates to control systems for the fuel circuit from a fuel reservoir to the injectors of a gas turbine engine. Such circuits typically comprise in series a low pressure pump connected to the reservoir, a high pressure pump, a throttle valve and a pressuring valve connected to the injectors. A pressure drop detector is connected across the throttle valve and a by-pass valve is connected between the outlet and the inlet of the high pressure pump so that, in response to the variations of the pressure drop across the throttle valve the by-pass valve is closed or opened more or less in order to adjust the recirculated fuel flow from the outlet of the high pressure pump back to the inlet and, maintain constant that pressure drop.

Military standards require that engine designers install a stop valve in the fuel supply circuit for new jet engines. Such mechanical stop valves are usually manually operated from the pilot's control column in order to allow interruption of the fuel supply to the injectors or by an auxiliary control lever when a thrust reverser selection is embodied.

2. Prior Art

A mechanical control system is described in French patent specification No. 2 180 483. This system is diagrammatically illustrated in FIG. 1 of the drawings. Fuel from the reservoir which is at the aircraft pressure (PCA) is delivered by a low pressure pump 1 at a low pressure BP to the inlet of a high pressure pump 2 which supplies the injectors 5 of a gas turbine engine via a throttle valve 3 and a stop and pressurizing valve 6. The fuel output from the high pressure pump at pressure PAM is passed to a throttle valve which is controlled at the control column and which directs fuel both to the start-up injectors 4 and via the stop and pressurizing valve 6 to the main injectors 5. The stop and pressurizing valve 6 only permits flow of fuel to the main injectors when combustion has been properly initiated in the combustion chamber. A purging system 8 is also connected into the fuel circuit to permit purging of the injectors when the engine is stopped. A pressure drop detector 9 is connected between the inlet and the outlet of the throttle valve 3 and has an output which is connected to a by-pass input of a control valve 10. The control valve 10 is connected between the outlet and the inlet of the high pressure pump and by-passes a part of the outlet flow from the high pressure pump back to the pump inlet.

The mechanical control of the described arrangement is effected by a three position valve actuated manually by the pilot. In the start-up phase, the valve is positioned so that it controls the stop and pressurizing valve 6 in such a manner that the pump pressure acts against the spring force in a secondary valve which prevents supply of fuel to the main injectors until the pump has reached its correct operational pressure rating. Meanwhile, fuel is being supplied by the high pressure pump 2 to the start-up injectors 4.

In order to stop the jet engine, the three position valve 7 is positioned so as to by-pass the fuel output from the high pressure pump back to the inlet of that pump.

The operation of this system is more fully described in the French patent specification No. 2 180 483.

SUMMARY OF THE INVENTION

The development of redundant electronic control systems should make the use of a mechanical control for a fuel circuit of a gas turbine engine obsolete. However, any electronic control for "making" and "breaking" the fuel circuit must be capable of operating at least with the same and preferably with greater certainty than prior art mechanical systems.

The present invention accordingly provides an electrical control system for a fuel circuit connected between a fuel reservoir and the fuel injectors of a gas turbine engine, said fuel circuit including a low pressure pump having an inlet connected to the reservoir and an outlet, a high pressure pump having an inlet connected to said outlet of said low pressure pump and an outlet, a throttle valve having an inlet connected to said outlet of said high pressure pump and an outlet, a pressurizing valve having an inlet connected to said outlet of said throttle valve and an outlet connected to said injectors, a pressure drop detector having a first inlet connected to said inlet of said throttle valve, a second inlet connected to said outlet of the throttle valve, and an outlet, the pressure in which varies according to the pressure drop detected between said first and second inlets, a by-pass valve having an inlet connected to said outlet of said high pressure pump, an outlet connected to said inlet of said high pressure pump, and a control inlet connected to said outlet of said pressure drop detector in order to close or to open more or less said by-pass valve and thereby adjust the recirculated fuel from the outlet of said high pressure pump back to said inlet thereof in response to any variation of said pressure at said outlet of said pressure drop detector, a first device including a first solenoid controlled valve capable of interrupting said connection between said outlet of said throttle valve and said second inlet of said pressure drop detector, and a second device including a second solenoid controlled valve capable of connecting said control inlet of said by-pass valve to said inlet of said low pressure pump.

In this control system, the manually operated three-position valve and the stop valve of the prior art system are replaced by the first and second devices. The first device which is preferably a redundant pair of first solenoid controlled valves connected in parallel, acts directly on the second inlet of pressure drop detector. The second device is a safety device which acts directly upon the control inlet of the by-pass valve in order to connect it to the fuel at the aircraft pressure (PCA). This second device is capable of being actuated in the case of failure of the first device. In a preferred embodiment, the first device includes two first said solenoid controlled valves connected in parallel with one another, two identical parallel control channels each associated with one said first solenoid controlled valve and each including an independent electrical power supply, a first control switch with two positions, two processing circuits and two solenoids for controlling said valve, each position of said switch connecting the power supply via a respective said processing circuit to a respective said solenoid respectively to open or to shut said first solenoid controlled valve, both first switches being mechanically coupled to each other. The second device preferably includes an independent electrical power supply, a second control switch with two positions, and a second solenoid for controlling said valve, one position of said second switch connecting the power supply to said second solenoid in order to open said second solenoid controlled valve.

DESCRIPTION OF A PREFERRED EMBODIMENT

Figure 1:
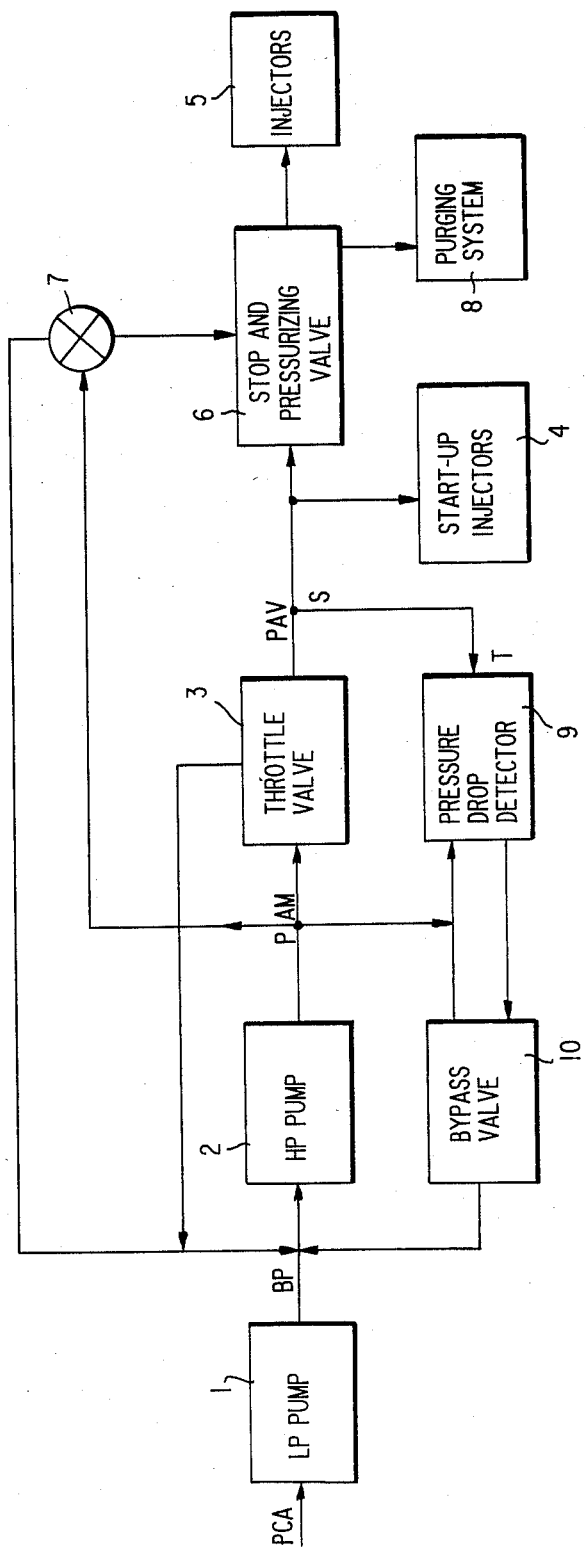
FIG. 1 is a block diagram of a prior art control system for a fuel circuit of a jet engine incorporating a mechanical control.
Figure 2:
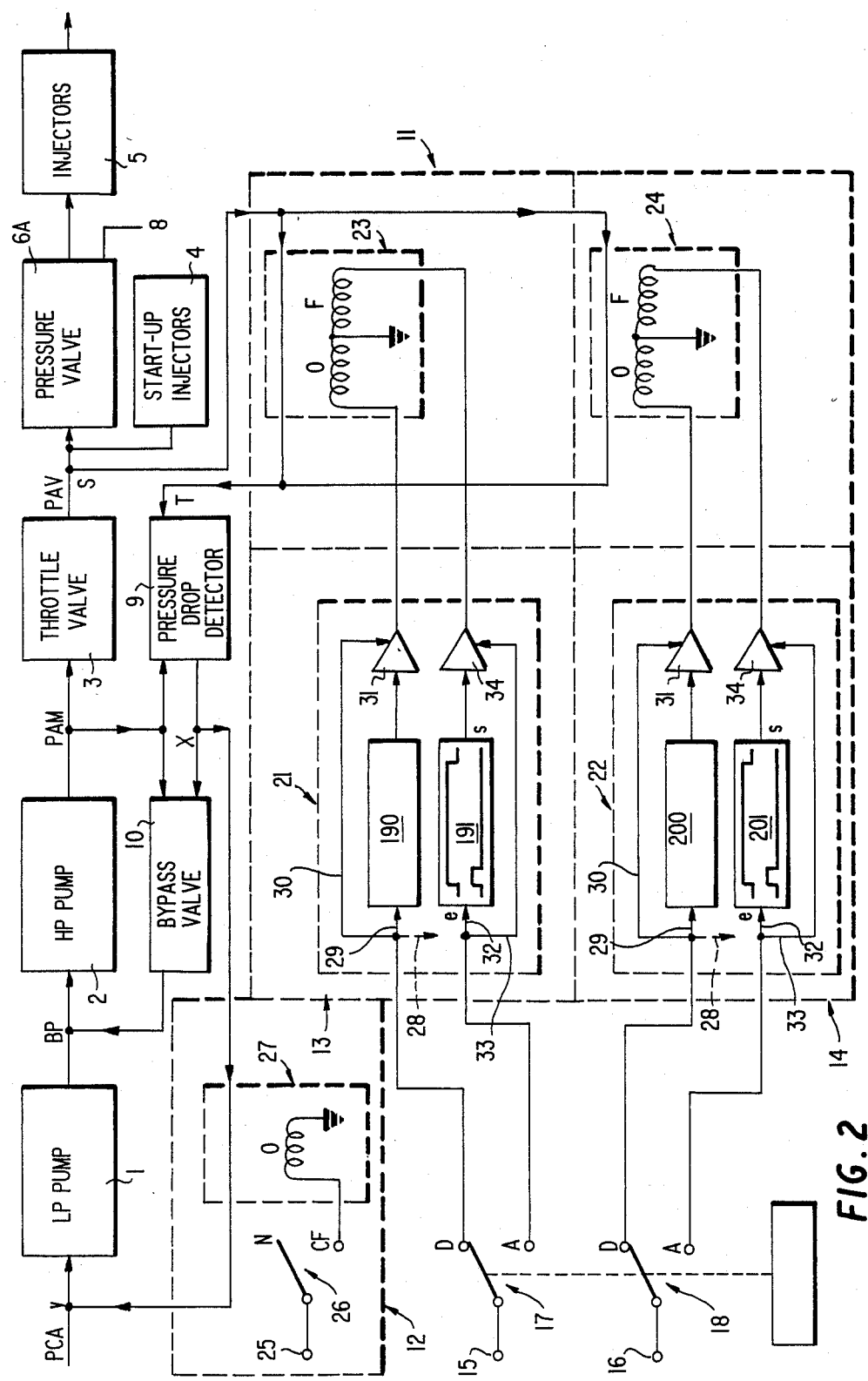
FIG. 2 is a block diagram of an electrical control system for a fuel circuit in accordance with an embodiment of the invention.

The fuel circuit shown in FIG. 2 is essentially the same as that described with reference to FIG. 1 except for the control system for "making" and "breaking" the fuel circuit.

A low pressure pump 1 receives fuel at aircraft pressure PCA from a reservoir (not shown) and supplies fuel at a low pressure BP to a high pressure pump 2 which supplies fuel at a high pressure PAM to the input of a throttle valve 3. The output of the throttle valve 3 at a pressure PAV is fed to a pressurizing valve 6A to which are connected the start-up injectors 4, the main injectors 5 and a purging system 8. A pressure drop detector 9 is connected across the throttle valve 3 and has two inputs connected to the inlet and outlet of the throttle valve 3, and an output which is connected to the by-pass input of a control valve 10 connected between the outlet and the inlet of the high pressure pump 2.

The function of the mechanical three-position valve 7 of the system described with respect to FIG. 1 is replaced by a first device 11 which will be described in more detail below. The device 11 includes two first solenoid-controlled valves 23, 24 each connected into the fuel circuit between a point S at the output of the throttle valve 3 and a point T which is the second input of the pressure drop detector 9. The first valves 23, 24 are connected in parallel with one another.

Both the first solenoid operated valves 23 and 24 are of the bistable type using two control solenoids O and F. A core element is movable between two end positions in which the fuel circuit between the points S and T is made and broken respectively. When the solenoid O is energised, this causes the core to move to a position in which the fuel circuit ST is "made". The core remains in this position until the other solenoid is energised to move the core to a position which "breaks" the fuel circuit. In the absence of electrical excitation or in the presence of two contradictory excitations the core remains in its original position. The solenoids can be energised continuously or intermittently.

A second device 12 which serves as an "safety cut-off device" is connected into the fuel circuit between a point Y at the inlet of the low pressure pump 1, and a point X at the control input of the by-pass valve 10. Operation of both these devices 11, 12, respectively, causes the short circuiting of the high pressure pump 2 by opening the by-pass valve 10 which results in closure of the pressurizing valve 6A.

The device 11 includes two, identical, parallel control channels 13, 14. Each channel has its own independent power supply, 15, 16 respectively which is connected to one terminal of a three-terminal two position first switch, 17, 18 The first switches allow the power supply to be connected to either of two further terminals D, A depending on the position of the first switch. The two first switches 17, 18 are coupled so as to be operated together. The position D where the power supply is connected to terminal D is the "start" position for the engine and the position A where the power supply is connected to the terminal A is the "stop" position. Each terminal D, A is connected to respectively one of the solenoids O, F via a processing circuit, which may be provided as part of a suitably programmed analogue or digital computer.

In the embodiment illustrated each D terminal is connected to three lines 28, 29, 30. The line 28 is used to provide a control signal for other starting functions of the engine. The line 29 is connected to a signal processing device designated 190 in channel 13 and 200 in channel 14. The signal processing device ensures that the engine starting takes place at an appropriate time relative to the programmed start up sequence for the particular engine. The output of the signal processing device is fed to one input of an amplifier 31. The line 30 is connected directly to a second control input of the amplifier 31 to provide a confirming signal and the output of the amplifier is connected to a terminal of the solenoid O. The amplifier 31 is arranged not to produce an output unless both inputs are at a high power level so that a spurious high output from the processing device cannot operate the valve unless it is confirmed by the high power level on line 30. This may be achieved by using an AND gate in series with the amplifier or by feeding the amplifier through the line 30.

Each terminal A is connected to two lines 32, 33. Line 32 is directly connected to a signal processing device designated 191 in channel 13 and 201 in channel 14. The signal processing device has an output connected to an amplifier 34 which is connected to one terminal of the other solenoid F in the associated bistable first solenoid controlled valve 23, 24. The line 33 is also connected to the amplifier 34 to provide a confirming signal as described above.

The processing devices 190, 191 and amplifiers 31 and 34 in the control channel 13 may have their functions performed by a computer 21. The corresponding parts 200, 201, 31, 34 in the control channel 14 may have their functions performed by a computer 22.

As indicated in the representation of the signal processing devices 191, 201, the function of these devices may be to convert the step signal caused by connection of the A terminal to the power supply into a pulse of sufficient duration to achieve switching of the solenoid valve. This means that the solenoid is not excited for longer than necessary thereby not causing undesirable heating. The processing devices 190, 200 may perform a similar function, The second device 12 includes a power supply 25 which is independent of the power supplies 15 and 16 for the first device 11. The power supply 25 is connected to one terminal of a two position second switch 26. The second switch 26 may connect this terminal to either of two terminals N and CF. In the position N the power supply is simply not connected. In the position CF the power supply is connected to one terminal of a solenoid O of a monostable second solenoid controlled valve 27. When the second switch 26 is connected to terminal N the device is in the "normal" position and the fuel circuit between the points X and Y is broken so that there is no communication between the reservoir and the by-pass input of the control valve 10. When the second switch 26 is connected to terminal CF the device is in the "safety cut-off" position in which power is supplied to the solenoid O causing the fuel path between the reservoir and the control input of the by-pass valve 10 to be made. This causes the aircraft pressure PCA to be applied to the by-pass valve 10 which causes that valve to be opened so that fuel output from the high pressure pump 2 is recirculated back to its input.

The three independent electrical power supplies 15, 16 and 25 are distributed around the aircraft in order to avoid any risk of common breakdown.

The system described above operates as follows.

When the engine is at rest the first switches 17, 18 are in the "stop" position A and the fuel circuit ST is broken because both the first solenoid-controlled valves 23, 24 are in the shut position.

When either or both the first solenoid valves, 23, 24 is actuated to break the fuel circuit between the output of the throttle valve 3 and the second input to the pressure drop detector 9, the pressure drop detector perceives the output pressure of the throttle valve as being too low. This causes the pressure drop detector to produce a sufficiently high output level on the control input to the by-pass valve 10 so as to by-pass the fuel from the high pressure pump back to its inlet. Therefore when the engine is at rest fuel can only circulate round the high pressure pump and does not pass to the injectors.

When the engine is at rest the second device 12 will have its second switch 26 set to N. In this position the fuel circuit XY is broken so that the control input to the by-pass valve 10 is influenced solely by the output of the pressure drop detector 9 which, as previously described perceives a high pressure difference because the fuel circuit ST is broken.

When it is desired to start the engine the first switches 17 and 18 are moved to the position D. This cuts off the electrical supply to the processing devices 191, 201 and connects the power supplies 15 and 16 to the lines 28, 29 and 30 in each of the two chains 13 and 14. The power supply on line 28 enables the ignition of the fuel in the start up injectors, and the power supply on lines 29 and 30 causes the solenoid O in each of the first solenoid controlled valves 23, 24 to be energised thereby making the fuel circuit ST. This has the effect of causing the pressure drop detector 9 to detect the pressure drop across the throttle valve 3. Therefore the by-pass valve 10 by-passes only a part of fuel to the inlet of the high pressure pump 2 allowing fuel from the output of the pump 2 to pass via the throttle valve 3 to the pressurizing valve 6A and from there to the start up injectors 4. The engine starts.

When the engine has achieved the required rating the starting injectors are cut off and fuel is supplied to the main injectors 5. In order to stop the engine, the first switches 17 and 18 are moved to position A which connects the power supply to processing circuits 191 and 201 respectively. This causes excitation of the solenoids F and causes the fuel circuit ST to be broken. This increases the output of the pressure drop detector 9 sufficiently to open more by-pass valve 10 making the bypass fuel circuit around the high pressure pump 2 so that fuel is no longer supplied to the throttle valve 3, pressurizing valve 6A and injectors 5. The engine stops.

If stoppage is not achieved, the pilot can operate the safety second switch 26 in the second device 12 to place this switch in the CF position. In this position the solenoid O is excited in order to cause the second valve 27 to make the fuel circuit XY so that the aircraft pressure is applied to the control input of the control valve and so the by-pass valve 10 is opened and the bypass fuel circuit around the high pressure pump 2 is made. This ensures stoppage of the engine as previously described.

Particular advantages of the control system described are as follows:

(1) The use of confirmation lines 30 and 33 in both channels ensures that a positive control order was given before the valves 23, 24 are operated.

(2) Security of operation of the device to ensure starting of the engine is achieved by the redundancy of the two channels 13 and 14 as well as the two first solenoid-controlled valves 23, 24. Since the valves do not operate directly on the main fuel circuit but on a branch circuit ST, they are only required to switch a relatively low flow. Therefore solenoid-controlled valves of relatively small dimensions and low electrical power consumption can be used. Such valves can readily be protected.

(3) The use of two valves in parallel in the fuel circuit ST may reduce the certainty of engine stoppage if one of the valves fails in a position in which the circuit ST is made. Stoppage of the engine can be secured in such an eventuality by operation of the second device 12. Again, the second solenoid controlled valve 27 in this device is in a branch circuit with a relatively small flow so that the solenoid valve can be of small dimensions and low electrical consumption.

(4) The maintenance of the selected running or stopped state of the engine is ensured in the present fuel control system by the use of bistable first solenoid-controlled valves 23, 24 which guarantee that the "start" or "stop" order is maintained until the arrival of a countermanding order.

The above described system is readily integrated in modern aircraft which for the most part have had their mechanical controls replaced by electrical controls.

We claim:

1. An electrical control system for a fuel circuit connected between a fuel reservoir and the fuel injectors of a gas turbine engine, said fuel circuit including a low pressure pump having an inlet connected to the reservoir and an outlet, a high pressure pump having an inlet connected to said outlet of said low pressure pump and an outlet, a throttle valve having an inlet connected to said outlet of said high pressure pump and an outlet, a pressurizing valve having an inlet connected to said outlet of said throttle valve and an outlet connected to said injectors, a pressure drop detector having a first inlet connected to said inlet of said throttle valve, a second inlet connected to said outlet of the throttle valve, and an outlet, the pressure in which varies according to the prssure drop detected between said first and second inlets, a by-pass valve having an inlet connected to said outlet of said high pressure pump, an outlet connected to said inlet of said high pressure pump, and a control inlet connected to said outlet of said pressure drop detector in order to selectively open said by-pass valve and thereby adjust the recirculated fuel from the outlet of said high pressure pump back to said inlet thereof in response to any variation of said pressure at said outlet of said pressure drop detector, a first device including a first solenoid controlled valve capable of interrupting said connection between said outlet of said throttle valve and said second inlet of said pressure drop detector and a second device including a second solenoid controlled valve capable of connecting said control inlet of said by-pass valve to said inlet of said low pressure pump.

2. A system according to claim 1, in which said first device includes two said first solenoid controlled valves connected in parallel with one another and two identical parallel control channels each associated with one said first valve and each including an independent electrical power supply, a first control switch with two positions, two processing circuits and two solenoids for controlling said first valve, each position of said first switch connecting the power supply via a respective said processing circuit to a respective said solenoid respectively to open or to shut said first solenoid controlled valve, both first switches being mechanically coupled to each other.

3. A system according to claim 1, in which said second device includes an independent electrical power supply, a control second switch with two positions, and a solenoid controlling said second valve, one position of said second switch connecting the power supply to said solenoid in order to open said second solenoid controlled valve.

4. A system according to claim 2, in which each processing circuit includes a signal processing device having an input connected to said first switch, and an amplifier having one input connected directly to said first switch commutator and another input connected to an output of said processing device, said amplifier being operative to energise said associated solenoid in response to a high power level at both said inputs.

5. A system according to claim 4, in which one said processing circuit of each channel associated with a "start" position of said first switch further includes a line connected to said first switch for providing a control signal for other starting functions of said engine.

* * * * *

UNITED STATES PATENT AND TRADEMARK OFFICE
CERTIFICATE OF CORRECTION

PATENT NO. : 4,747,263            Page 1 of 2

DATED : MAY 31, 1988

INVENTOR(S) : PIERRE M.H. GERARD ET AL

It is certified that error appears in the above-identified patent and that said Letters Patent is hereby corrected as shown below: Title Page:

In the abstract, line 6, delete "interruption" and insert therefor --interrupting--.

In the abstract, line 10, after "control" insert therefor --by-pass--.

In the abstract, line 27, delete "supply regulator" and insert therefor --throttle valve--.

Column 3, line 34, delete "by-pass input of a control valve" and insert therefor --control input of a by-pass valve--.

Column 3, line 51, delete "energised," and insert therefor --energized,--.

Column 3, line 53, delete "energised" and insert therefor --energized--.

Column 3, line 58, delete "energised" and insert therefor --energized--.

Column 3, line 59, delete "an" and insert therefor --a--.

Column 4, line 3, delete "18 The" and insert therefor --18. The--.

UNITED STATES PATENT AND TRADEMARK OFFICE
CERTIFICATE OF CORRECTION

PATENT NO. : 4,747,263

DATED : MAY 31, 1988

INVENTOR(S) : PIERRE M.H. GERARD ET AL

It is certified that error appears in the above-identified patent and that said Letters Patent is hereby corrected as shown below:

Column 4, line 57, delete "," and insert therefor --.--.

Column 5, line 3, delete "by-pass input of the control valve" and insert therefor --control input of the by-pass valve--.

Column 5, line 46, delete "energised" and insert therefor --energized--.

Column 6, line 4, delete "control" (second occurrence) and insert therefor --by-pass--.

Column 6, line 57, delete "prssure" and insert therefor --pressure--.

Column 8, line 14, delete "energise" and insert therefor --energize--.

Signed and Sealed this

Fifteenth Day of November, 1988

Attest:

DONALD J. QUIGG

*Attesting Officer*        *Commissioner of Patents and Trademarks*